No. 787,031. PATENTED APR. 11, 1905.
L. GIRARDOT.
FRICTION CLUTCH FOR MOTOR CARS OR OTHER VEHICLES.
APPLICATION FILED OCT. 14, 1904.
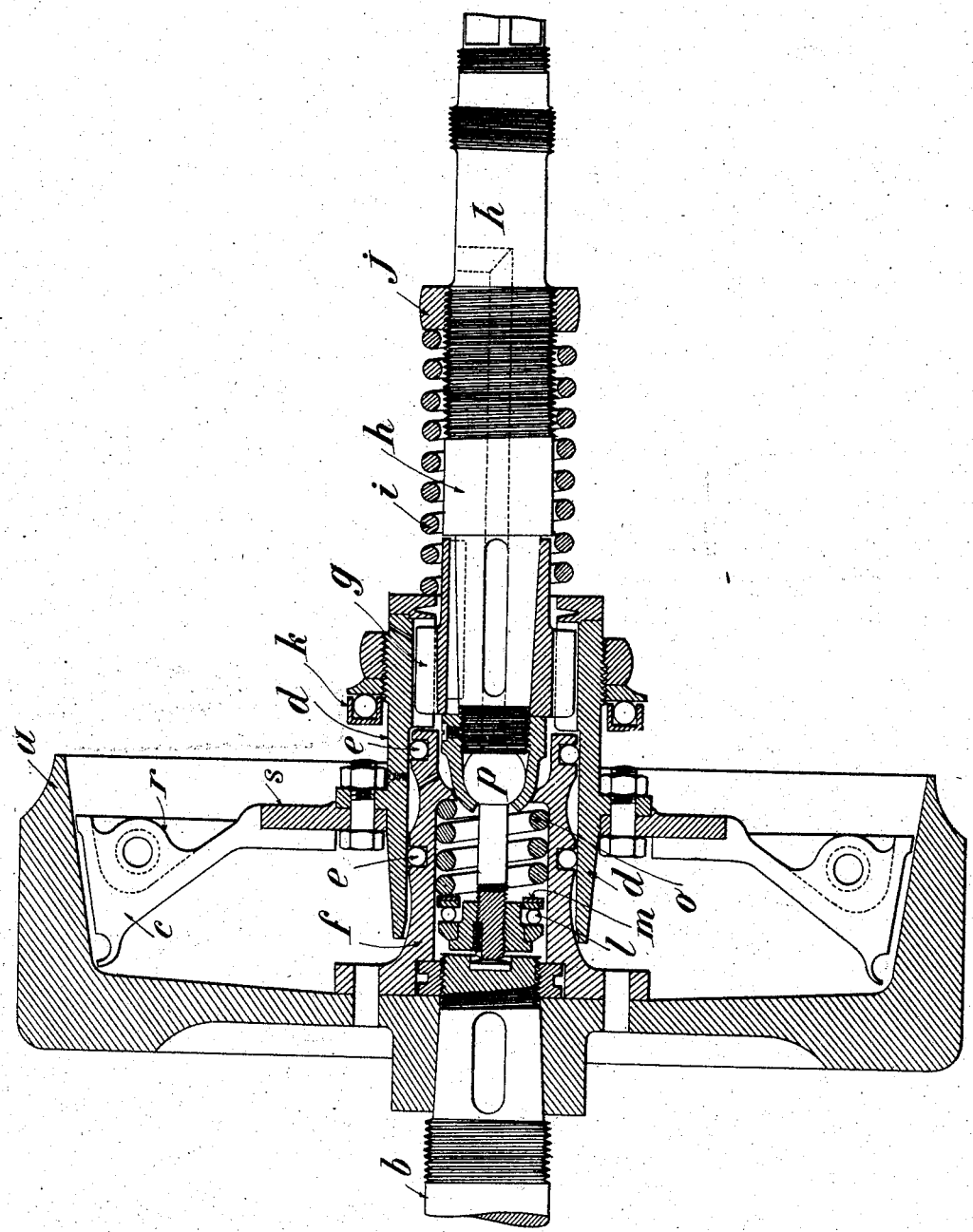
Witnesses
H. M. Kuehne
John A. Prewal.
Inventor
Léonce Girardot
By 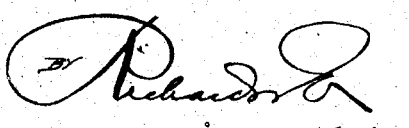

No. 787,031. Patented April 11, 1905.

UNITED STATES PATENT OFFICE.

LÉONCE GIRARDOT, OF PUTEAUX, FRANCE.

FRICTION-CLUTCH FOR MOTOR-CARS OR OTHER VEHICLES.

SPECIFICATION forming part of Letters Patent No. 787,031, dated April 11, 1905.

Application filed October 14, 1904. Serial No. 228,473.

*To all whom it may concern:*

Be it known that I, LÉONCE GIRARDOT, a citizen of France, residing at 7 Rue Ampère, Puteaux, Seine, in the Republic of France, have invented new and useful Improvements in Friction-Clutches for Motor-Cars or other Vehicles, of which the following is a specification.

This invention relates to an improved friction-clutch specially adapted for use with motor-cars, the said clutch comprising a friction-cone which is so arranged that it is at all times exactly concentric with a fly-wheel, against the inner surface of which it is adapted to bear, whereas a certain amount of relative angular displacement between the driving-shaft and the driven shaft is allowed. A ball-bearing against which the driven shaft abuts is so arranged that it automatically adjusts itself to the angular positions of the said shaft. This was not the case with the arrangements hitherto known. The mounting and unmounting of the friction-cone are facilitated by constructing the latter in two parts, as will be described hereinafter.

One form of the improved clutch is shown in longitudinal section in the annexed drawing.

The clutch comprises the fly-wheel $a$, which is fixed to the driving-shaft $b$ and is provided with a recess for the cone $c$. The latter, which is fixed to a sleeve $d$, provided with teeth, is concentrically mounted on the hub $f$ of the fly-wheel by means of two ball-bearings $e$. By this means the two members of the clutch are caused to remain at all times concentric with regard to each other. When the fly-wheel and cone are in contact with each other, the sleeve $d$, fixed to the cone, drives, by means of the teeth $g$, the shaft $h$, connected with the speed-gear, and a suitable amount of play allowed to the said teeth permits of a certain amount of angular displacement of one shaft with regard to the other; but it will be understood that even when such displacement is produced the driving of the speed-gear continues and the friction-cone and fly-wheel remain exactly concentric with each other.

As is usual with similar clutches, a spring $i$, abutting against a ring $j$, fixed to the shaft $h$, tends to keep the clutch constantly in gear, the disengaging of the clutch being effected by means of a collar $k$, provided with a ball-race and balls acting on the sleeve $d$. To receive the longitudinal pressure continuously exerted on the shaft $h$, an abutment provided with a ball-race and balls $l$ is provided. The said balls $l$ do not, however, rest against a fixed part of the hub of the fly-wheel, but against a ring $m$ and a powerful spring $o$, which abuts against the flange of the hub $f$. To the end of the driven shaft a rod is connected by means of a ball-and-socket joint $p$ in such a manner that owing to the combination of the said ball-and-socket joint and rod the ball-abutment will always remain adjusted even when the speed-gear shaft assumes angular positions, and all the balls will remain in contact with the ball-race. For the same reason the adjustment of the ball-abutment when assembling the parts is very easy to effect. To facilitate the mounting and unmounting of the friction-cone, the latter consists of two parts or of two half-disks fixed together near their circumference by means of lugs $r$ and fixed to a central support $s$, which also consists of two parts and is fixed to the sleeve $d$ in the manner shown in the drawing.

Having now described my invention, what I claim as new, and desire to secure by Letters Patent, is—

1. A friction-clutch comprising a fly-wheel $a$ having a hub $f$ fixed to the driving-shaft $b$ and provided with a recess, in combination with a friction-cone $c$, a sleeve $d$ to which said cone is rigidly connected provided with inward teeth and concentrically mounted on the hub $f$ of the fly-wheel, ball-bearings $e$ provided in said hub $f$, teeth $g$ on the driven shaft $h$ gearing, with a suitable amount of play, with the teeth of the sleeve $d$, and resilient means for bringing into contact the cone $c$ with the fly-wheel $a$, substantially as and for the purpose set forth.

2. A friction-clutch comprising a fly-wheel $a$ having a hub $f$ fixed to the driving-shaft $b$ and provided with a recess, in combination with a friction-cone $c$, a sleeve $d$ to which said cone is rigidly connected provided with inward teeth and concentrically mounted on the hub $f$ of the fly-wheel, ball-bearings $e$ provided in said hub $f$, teeth $g$ on the driven shaft $h$ gearing, with a suitable amount of play, with the teeth of the sleeve $d$, a rod connected by means of a ball-and-socket joint $p$ to the driven shaft $h$, an abutment fixed on said rod and provided with a ball-race and balls $l$, a ring $m$ against which said balls $l$ rest, a powerful spring $o$ which bears against said ring $m$ and abuts against a flange of the hub $f$, and resilient means for bringing into contact the cone $c$ with the fly-wheel $a$, substantially as and for the purpose set forth.

In testimony whereof I have signed my name to this specification in the presence of two subscribing witnesses.

LÉONCE GIRARDOT.

Witnesses:
 ANTOINE LAVOIX,
 ARCHIBALD R. BAKER.